United States Patent [19]

Krane

[11] Patent Number: 4,682,956
[45] Date of Patent: Jul. 28, 1987

[54] APPARATUS AND METHOD FOR LEARNING ABOUT THE RELATIONSHIPS AND PERSONALITIES OF A GROUP OF TWO OR MORE PERSONS

[76] Inventor: Leonard Krane, 1855 Sunset Plaza Dr., Los Angeles, Calif. 90069

[21] Appl. No.: 802,778

[22] Filed: Nov. 27, 1985

[51] Int. Cl.[4] .......................... G09B 19/00; A63F 3/00
[52] U.S. Cl. ...................................... 434/237; 273/243
[58] Field of Search ................ 434/237; 273/238, 243, 273/256, 273, 236

[56] References Cited

U.S. PATENT DOCUMENTS

| | | | |
|---|---|---|---|
| 509,881 | 12/1893 | Doerflinger | 273/296 |
| 2,026,082 | 12/1935 | Darrow | 273/256 |
| 3,674,274 | 7/1972 | Schur | 273/273 |
| 3,733,074 | 5/1973 | Daley | 273/238 |
| 3,777,413 | 12/1973 | Zaccheo | 434/237 |
| 3,778,911 | 12/1973 | Woolman | 434/237 X |
| 3,948,525 | 4/1976 | Faintuch et al. | 273/273 |

OTHER PUBLICATIONS

A Book Entitled *The Luscher Color Test*, Translated and Edited by Ian A. Scott, based on the original German text by Dr. Max Luscher, copyright 1969.
The Game Marketed under the Trademark "TRIVIAL PURSUIT" ©1981.
*TRIVIAL PURSUIT* ©1981 Selchow and Righter Co. 4 pages.

Primary Examiner—William H. Grieb
Attorney, Agent, or Firm—Lyon & Lyon

[57] ABSTRACT

An apparatus and method for learning about the relationships and personalities among a group of participating persons, wherein a plurality of players can utilize tokens on a board in combination with a plurality of color cubes, scoring sticks, secret answer wheels, and question cards in the preferred embodiment of the invention. Scoring and the movement of the tokens is controlled by a combination of chance and the participating persons' knowledge of each other, as revealed by the secret answering of questions related to the present and future feelings and intentions of given persons chosen to be participants. Scoring is noted by insertion of relationship sticks into color cubes located on the tokens. The color personalities of the participating persons are reflected in individual participating person's sequential choice of color cubes for that person's token and thus affects the content of questions to be asked and answered relating to the personality of the participant.

20 Claims, 8 Drawing Figures

TODAY

 I'D RATHER TALK ABOUT: /24

A.  MY NEXT VACATION PLANS.
    B.  THE UPCOMING POLITICAL CAMPAIGNS.
    C.  THE PROBLEMS OF U.S. - RUSSIAN RELATIONS.

 I'M USUALLY ON TIME FOR APPOINTMENTS:

TRUE OR FALSE

 BEFORE AN IMPORTANT DECISION I:

A.  THINK IT OVER MYSELF.
    B.  DISCUSS ALL WITH MY MATE.
    C.  GET ADVICE FROM EVERYONE.

 GOING TO THE MOVIES WITH FRIENDS IS MORE IMPORTANT THAN WHICH MOVIE WE SEE.

TRUE OR FALSE

 I'D RATHER GO TO:

A.  A BASEBALL GAME.
    B.  AN ART GALLERY OPENING.
    C.  A BOXING MATCH.

 I WOULD NEVER:

A.  DRIVE FASTER THAN THE SPEED LIMIT.
    B.  GO OFF MY DIET.
    C.  CHANGE MY OCCUPATION OR PROFESSION.

■ DO I GET UPSET IF MY MATE PLANS DINNER WITHOUT CONSULTING ME?

YES OR NO

FIG. 5

APPARATUS AND METHOD FOR LEARNING ABOUT THE RELATIONSHIPS AND PERSONALITIES OF A GROUP OF TWO OR MORE PERSONS

BACKGROUND OF THE INVENTION

The invention relates to an apparatus and a method for learning about the relationship and personalities of two or more persons and more particularly to an apparatus and a method that determines which person is both better known to the other persons and knows the other persons better.

Games are known in which the players must utilize their knowledge of each other for tactical purposes, in anticipating the reactions of other players to chance events and the players' movements. However, such games are usually played for fun and have little educational value. To the extent that existing games are also educational, such as improving a person's vocabulary or other skills, then such games tend to focus on improving a player's own knowledge or skill. Thus, there exists a need for a simple and enjoyable apparatus and method for learning more about the personalities of other people so that the participants can improve their relationships and learn more about themselves and others in the process as well as improving relationships between the players. No games or other apparatus are known that directly involve the personalities of the players both in order to determine movements on the game board and also to determine the overall personality of the player. No method is known that acts to reveal the participants' knowledge of each other and thus their relationships.

It is known that the selection of colors can provide insight into psychological preferences of a human being. This concept has been set forth in many publications by M. Luscher and has been described in a book entitled, "The Luscher Color Test." A translated version of this book, edited by Ian A. Scott, has been published by Random House, Inc. Library of Congress Catalog Card Number: 70-85562, the disclosure of which is specifically incorporated herein by reference. However, while this relationship has been known for decades to psychologists, and the test has been used for certain informational purposes such as in connection with employment applications, the test has not found widespread instructive use in the community as a whole. Accordingly, the benefits and insight which can be achieved by use of the teachings of M. Luscher have not been fully developed. Thus, there exists a long felt need to incorporate the teachings of M. Luscher in an apparatus and method which can provide a simple, but yet enjoyable, vehicle for learning more about the psychological preferences of two or more persons.

SUMMARY OF THE INVENTION

The method of the present invention comprises choosing a first and a second person from a group of two or more persons practicing the method, selecting which of the first and second persons is to be a participant, selecting one of a plurality of questions together with possible answers to be asked related to the personality or character of the participant, and if the participant is the first person, recording a secret answer of the second person to the selected question whereas if the participant is the second person, recording the secret answer of the first person to the selected question, announcing the answer of the participant, and comparing the answer of the participant with the secret answer. Numerous variations and additions to this method are possible.

The apparatus of the present invention may comprise a board, dice, tokens, perforated color cubes, relationship sticks, question cards, card boxes, and answer wheels. In the preferred embodiment, the apparatus is embodied in a game so as to provide an entertaining vehicle for practicing the present invention.

An advantage of the present invention is that it may be adapted to provide a method and apparatus which depends upon answering questions about participating persons' preferences, desires, needs, actions, and the like. The questions and the corresponding possible answers are related to the personality or character of the participant by being keyed to the "color personality" of each participating person. Once the "color personality" has been utilized to select a question, the category of questions with possible answers is utilized to learn more about the relationships and personalities of the group of persons.

A further advantage of the present invention is that it provides a method and apparatus which may enhance the relationships of the players through increasing their knowledge about each other and themselves.

Thus, an object of the present invention is to provide a method and apparatus for determining which participating person is both better known to the other participating persons and/or knows the other persons better, which may assist the participating persons to determine the nature of their personalities and relationships.

This and yet additional objects and features of the invention will become apparent in the detailed discussion below of the preferred embodiment of the invention.

BRIEF DESCRIPTION OF THE DRAWINGS

In order that the principle of the invention may be readily understood, a single preferred embodiment of the apparatus thereof is disclosed in the accompanying drawings, wherein:

FIG. 5 represents one of the question cards used to provide the questions concerning personality, which are to be answered by the participating persons;

DESCRIPTION OF THE PREFERRED EMBODIMENT

1. Apparatus for use in practicing the method of the preferred embodiment.

Figure 1:
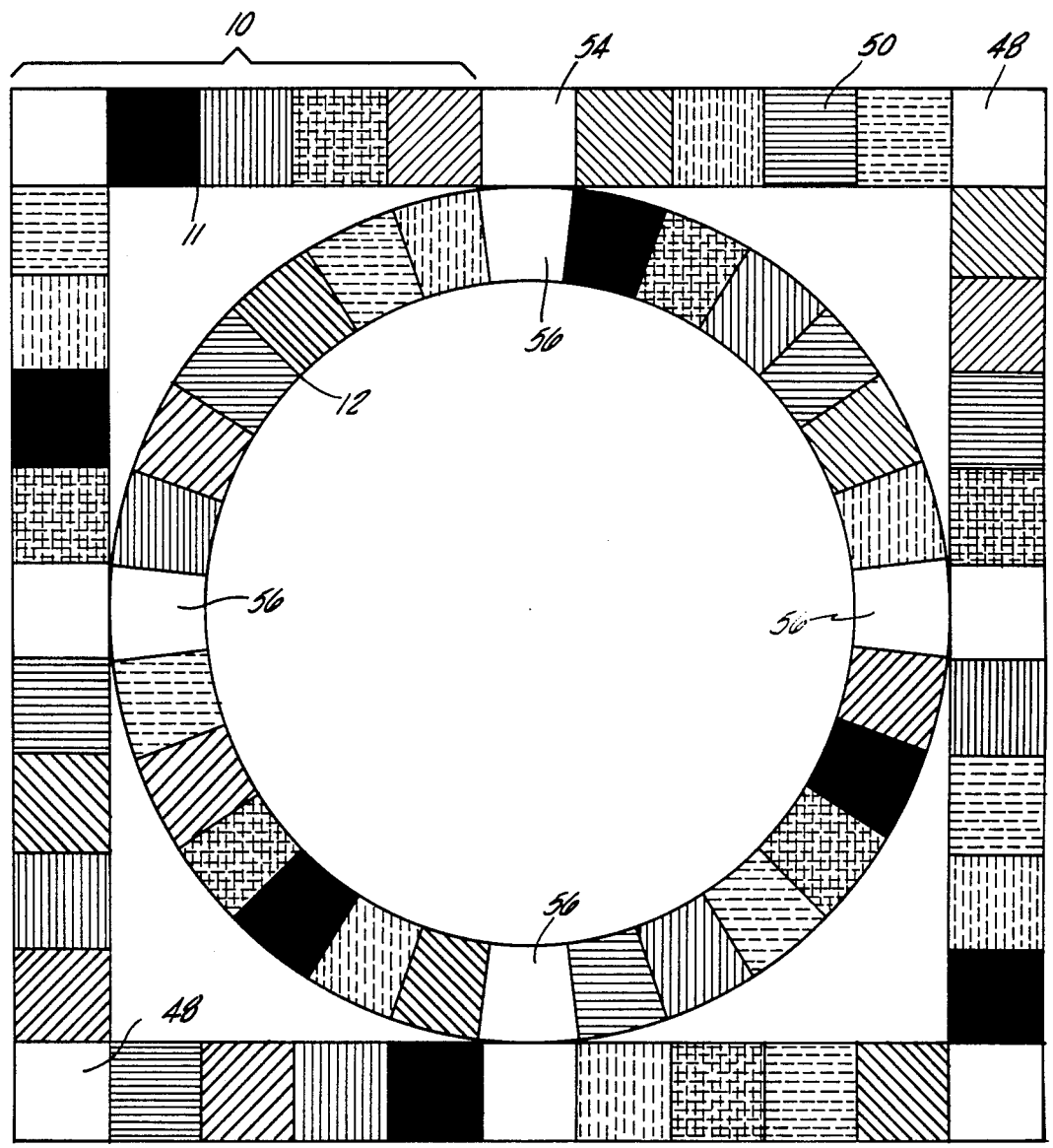
FIG. 1 is a plan view of one form or arrangement of board for the apparatus, the distinctive colors for the colored positions, spaces or segments being indicated thereon according to the chart for draftsmen in the Patent and Trademark Office Rules of Practice.

A preferred apparatus includes a board, indicated as a whole as 10 in FIG. 1. Imprinted on the upper surface of the board 10 are paths or courses 11 and 12 formed of colored spaces or segments. One path, 11, is rectangular and follows the perimeter of the board; the other, 12, is circular and is contained by the rectangular path, to which it is congruent at four points. The colors of the spaces or segments are alternatively red, blue, green, yellow, black, grey, violet, and brown with white spaces interspersed therewith.

Figure 2:
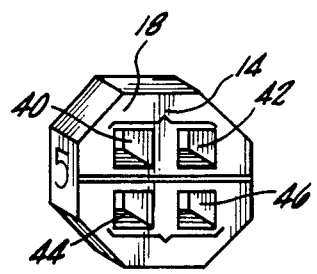
FIG. 2 is a view in elevation of one of the symbols or tokens which are used by the several participating persons to indicate their positions on the courses depicted on the board.

A plurality of tokens are provided and a token bearing the token number 5 is shown in FIG. 2. The tokens can be made of a thermoplastic material and contain four openings, receptacles or slots 40, 42, 44 and 46.

The openings 40 and 42 are in the "FUTURE" set of openings 14, and openings 44 and 46 are in the "TODAY" set of openings 16.

Figure 3:
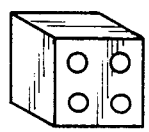
FIG. 3 is a view in elevation of a color cube which may be placed in one of the openings or slots on a participating person's token.
Figure 4:
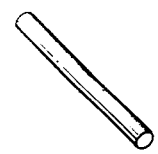
FIG. 4 is a side view of a relationship stick which is intended to be inserted into one of the holes in the color cubes.

Each token may hold up to four color cubes or pieces in its openings. The color cubes are placed in the openings according to a procedure to be described below. A representative color cube is shown in FIG. 3. If six tokens are provided, then forty-eight color cubes are provided, and are divided into eight sets, six each colored red, blue, green, yellow, black, grey, violet, and brown. The color cubes contain four perforations 22. Four relationship sticks can be inserted into each color cube. Of course, as would be apparent to one of ordinary skill in the art, the number of tokens, color cubes, relationship sticks and perforations can be varied without departing from the scope of the present invention.

Question cards, one of which is shown in FIG. 5, are provided in eight sets, of 55 cards each, for a total of 440 cards. The cards of each set have color borders of one of eight colors: red, blue, green, yellow, black, grey, violet, and brown. Each side of each card contains seven questions 24; each of the questions is preceded by a colored marker or indicator 26 which is one of the eight colors used in the apparatus, i.e., red, blue, green, yellow, black, grey, violet and brown, but not that of the colored border of the card. Each question marker 26 in a given card will have a different color. The questions can conveniently require either a yes/true or no/false answer or a multiple choice answer (e.g., an answer identified by symbols such as A, B or C). One side of the card is labelled "FUTURE" and the other "TODAY". The card 100 depicts an illustrative side which is labelled "TODAY". Of course, the number of question cards can be varied and additional question cards could be provided as is currently common in connection with a popular game marketed under the trademark Trivial Pursuit.

The color coded sets of questions to be used with the preferred embodiment of the invention are in part based upon personality concepts evolved from color preference tests. The "color personalities" of participating persons are based upon the sequence of their choice of four color cubes for their tokens and may vary from game to game as the moods and attitudes of participating persons shift and evolve. However, a key aspect of the present invention is that the initial sequential choice of color cubes by each player be related to aspects of personality and behavioral preferences of the player. While the present description utilizes the choice of color cubes, the means by which the color choices are made can vary so long as the initial selection process relates to selections keyed to the "color personality" of the players. Indeed, it is also contemplated that a player be required to select more than four color cubes in an advanced version of apparatus according to the present invention. Further, the first two color cubes chosen relate to the participant's desired future behavior and/or state of mind. The next two color cubes chosen relate to the participant's present behavior and/or state of mind. Questions and corresponding answers are based at least in part upon personality profiles developed from the Luscher color test which reveal personality through sequential color choices. The questions on a given color border card are keyed to the "color personality" of the player. For example, red border cards have different types of questions and answers than would any other colored border cards.

By knowing the personality profiles which have been described in the book "The Luscher Color Test" referenced in the "Background of The Invention" set forth above, questions and corresponding answers can be designed such that the combination of a given question with a particular answer will reflect a personality and/or behavioral characteristic which would fall within or relate to a given personality profile. Thus, to the extent that a player knows the personality of another player who is designated to answer the question, that player should be able to correctly predict the answer which will be given to the question by the other player. For example, if the person to answer the question had selected blue and yellow for the TODAY color cubes, then part of the personality profile of that person would be "Willing and adaptable. Only at peace when closely attached to a person, group or organization on which reliance can be placed." Quoted from "The Luscher Color Test", translated and edited by Ian Scott, ISBN:0-671-49 177-6, Washington Square Press (New York, 1969) at page 125, which is directed to interpretation tables, whereas another part of the personality profile relating to structural meaning of the color pairs is set forth at page 86. To relate to the personality and/or behavioral characteristic, a question with corresponding answers, by way of example only, might be as follows: In my spare time, I prefer to (A) take walks by myself; (B) read; or (C) be with friends or associates. Based upon the given personality profile, as revealed by the sequential choice of blue and yellow colors, respectively, to reflect the present color personality of the person who is to answer the question, one would predict the person answering the question to choose "(C) be with friends or associates". Further examples of questions are set forth in FIG. 5.

Figure 6:
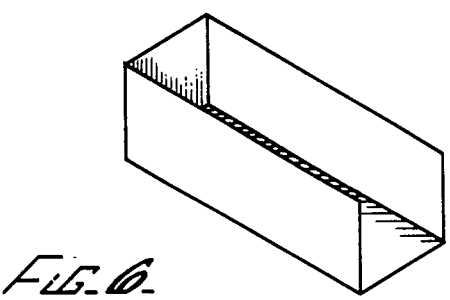
FIG. 6 is a perspective view of one of the card boxes used to hold the question cards of the preferred embodiment.
Figure 7:
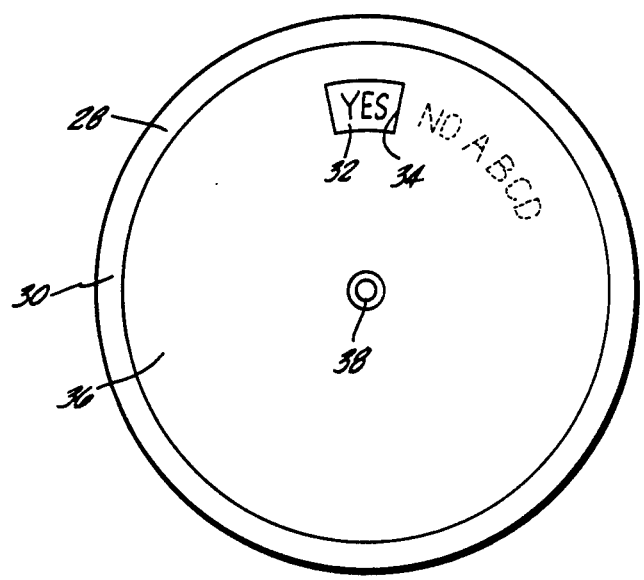
FIG. 7 is a view in elevation of an answer wheel which is used by the participating persons to secretly indicate their answers to questions concerning another person's personality.

Eight card boxes, one of which is shown in FIG. 6, hold the eight sets of question cards, one box per set. Six answer wheels are provided which permit participating persons to secretly record their choice of answers to questions posed from the question cards. One of the answer wheels is indicated as a whole in FIG. 7, generally designated as 28. The answer "YES/TRUE", which is printed on outer disc 30 and indicated as 32, appears through the window 34 of inner disc 36. Outer disc 30 may be rotated about a rivet axis 38 to change the answer. Other means of secretly recording an answer could be used, such as choosing answer cards, writing down the answer on paper and the like. Electronic answer recording devices might also be used.

Figure 8:
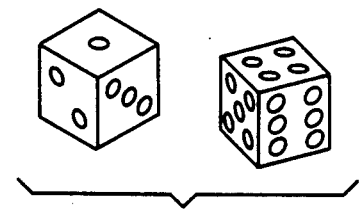
FIG. 8 represents in perspective the dice used to determine the extent or length of the moves of the participating persons along the paths or courses depicted on the board of the apparatus.

A pair of dice, shown in FIG. 8, are used to randomly determine movements of tokens, as will be explained below. Other means for generating random numbers, such as a spinner, could also be provided for this purpose.

2. The method for determining relationships and personalities according to the preferred embodiment of the invention A method for learning about the relationships and personalities according to the present invention may be practiced by two or more participating persons utilizing the preferred apparatus described above. The board 10 is placed on a table or other convenient location and each color set of question cards is aligned within a card box on the table. Each participating person takes one token and one answer wheel. Each participating person in turn rolls the dice, with the participating person rolling the highest number commencing the practice of the method. The participating person initiating the practice of the method is called the First Person. As will be described later, the participating persons alternate the role of First Person among themselves. In addition, while the selection of the person commencing the practice of the method has been described as the function of a random selection process, the players could choose the person to commence the method, or the sequence by which the method would be practiced, by any appropriate process agreed upon among themselves.

The First Person places in front of him or her one color cube of each of the eight colors in any color sequence, for a total of eight color cubes. The First Person then chooses the color cube he or she likes best and places it in the token in the left opening 40 of the FUTURE set of openings 14, places the next-best liked color in the right opening 42 of the FUTURE set of openings 14, places the third-best liked color cube in the left opening 44 of the TODAY set of openings 16 and places the fourth-best liked color cube in the right opening 46 of the TODAY set of openings 16. The four remaining color cubes rejoin the rest of the color cubes. While color cubes have been utilized in the instant description as physical indicia that relate to the person's color personality, it would be apparent to one of ordinary skill in the act that other physical color indicia could also be utilized.

The other persons in turn each repeat this "color personality" selection process for their tokens. The sequential color choices may vary with a person's moods for any session at which the method of the present invention is practiced.

The First Person then places his or her token or marker on any corner space 48 on the board, rolls the dice and moves the token the number of spaces indicated in any direction that follow a playing path or course. The token may be moved, during the move, to the border spaces that form the rectangular path 11 or to the spaces that form the inner circle path 12. Direction may be changed on subsequent moves. If the token lands on a border color space matching one of the four color cubes in the FIRST PERSON's token, a question from a set of question cards will be chosen according to a process described below. If the token lands on a color space not matching one of the four color cubes in the token (except for white—see below) the participating person on the left of the First Person assumes the role of First Person.

Each card has seven questions on each side, one side headed "Future" and one sided headed "Today". The headings indicate the time with respect to which the questions are addressed concerning color personality. Questions can conveniently be of two types, either answered Yes/True or No/False or with multiple choice answers which are marked or identified as A, B, or C. Each question is next to one of seven colored squares or markers 26. (For example, a card from the blue set has squares colored red, green, yellow, black, grey, violet and brown.) The questions are keyed to the "color personality" of the participating persons, based upon each participating person's sequential choice of four of the eight color cubes for his or her token for each game.

To describe the selection process of the preferred embodiment of the present invention for question card sets and individual questions along with their corresponding possible answers, suppose the First Person has blue and yellow cubes in the left and right FUTURE set of openings 14 of the token and red and green cubes in the left and right TODAY set of openings 16. Because the color cubes in the left openings of the FUTURE and TODAY set of openings will always determine the color set of cards from which a card will be drawn, questions to be answered by the First Person will be drawn from either the blue or the red sets of cards. Thus, if the First Person lands on a blue or yellow border space 52, the first card from the blue set of cards is drawn, turned to the FUTURE side, and the question along with its corresponding possible answers next to the yellow square or marker are read aloud by the First Person. The First Person will ultimately answer the read-aloud question and corresponding answers with respect to his or her personality because his or her token landed on a border space. In similar fashion, if the First Person lands on a green or red border space 52, the first card from the red set of cards is drawn, turned to the TODAY side, and the question along with its corresponding possible answers next to the green square or marker are read aloud by the First Person and the Second Person records a secret answer. The First Person will ultimately answer the question and corresponding answers with respect to his or her personality because the token landed on a border space. As used herein, the term "secret answer" defines an answer which is not known to the person answering the question but may or may not be secret as to other members of the group. The First Person then answers the question aloud and the secret answer is revealed. If the secret answer is the same as the First Person's answer, the correct match-up of answers will result in an award of one or more relationship sticks. In a first method, the First Person places one relationship stick in his or her token's color cube that matches the color space landed on. In a second method according to the present invention, the First Person and the Second Person may both receive relationship sticks for a correct match-up and the Second Person can place the relationship stick in any of his or her color cubes whereas the First Person can place the relationship stick in the token color cube that matches the color space the First Person landed on. Alternative methods for indicating success would be to tally points on paper or otherwise, award physical objects other than relationship sticks as indicia of success, and the like. The practice of the method then continues with another roll of the dice. Cards are placed in the rear of the color set after each question.

For convenience, the person to whom questions are directed will hereinafter be called the "Participant". The Participant may or may not be the First Person. If the First Person lands on a border space that matches the color of a color cube on that person's token, the First Person is the Participant whereas if the First Person lands on an inner circle space that matches the color of a color cube on another person's token, the Second Person will be the Participant.

As is apparent from the above description, border spaces can reveal personalities and relationships through other participating persons' knowledge of the First Person whereas inner circle spaces can reveal personalities and relationships through the First Person's knowledge of other participating persons.

The First Person's token may be moved into the inner circle color spaces at spaces in the inner circle path congruent to the border path. Here, the color space landed on relates to the color cube in the TODAY or FUTURE section of the token of any participating person (the "Second Person") designated by the First Person that matches the color of the space landed on by the First Person. The Second Person picks the question card and reads the matching color question and corresponding answers according to the procedure described above for the First Person when in the rectangular border course since the Second Person is now the Participant. The First Person uses the answer wheel to secretly answer the question while the designated Second Person answers the question aloud. If the First Person's secret answer is correct, a relationship stick is inserted into any of the First Person's color cube needed for scoring. If the method is being practiced such that both the First and Second Persons receive a relationship stick for a correct answer, then the Second Person inserts a relationship stick into the Second Person's color cube that matches the color space which the First Person landed on. The practice of the method then continues with another roll of the dice if the First Person has chosen the correct secret answer; otherwise the person to the First Person's left becomes the First Person.

If a token lands on a white border space 48 or 54, the First Person may pick a card from a color set matching the left FUTURE or left TODAY color cube in the First Person's token (the choice of FUTURE or TODAY being made as needed for acquiring relationship sticks). The question and corresponding answers will be chosen according to the method set forth above in connection with border spaces. If the token lands on a White inner circle space 56, the First Person designates any participating person (the "Second Person") to pick a question card from the question card set whose color matches the left FUTURE or left TODAY color cube in the Second Person's token. Upon a correct answer, a person receiving a relationship stick may place it into either color cube of their FUTURE or TODAY set. The practice of the method of the preferred embodiment of the invention then proceeds as for border, or inner circle, color spaces depending on whether the white space is located within the border or inner circle paths.

For the shortest practice of the method of the preferred embodiment of the invention, the participating person best acquainted with and/or best known to the other participating persons (the best-related person) is the first to be able to put one relationship stick in each of the four color cubes in that person's token. In the case of a tie, during a move, the First Person is the winner.

A longer way to practice the method requires the best related participating person to insert four relationship sticks in each of the four color cubes in the token. Intermediate levels would require two relationship sticks, or three sticks, in each color cube while advance play might require additional color cubes in the token and/or more relationship sticks in each color cube. Variations could simply require an arbitrary number of sticks in the token.

The group of persons should decide before the practice of the method begins whether they may discuss answers during the game and also whether they should accept time limits for discussion in order to allow the method to proceed.

As will be apparent to those skilled in the art in light of the preceding disclosure, many modifications, alterations, and substitutions are possible in the method and apparatus of this invention without departing from the spirit or scope thereof. Accordingly, the invention is not intended to be limited to the particular methods and apparatus described herein except as may be required by the lawful scope of the following claims.

What is claimed is:

1. A method for learning about the relationships and personalities of a group of two or more persons, comprising:
    chosing a first person and a second person from the group of persons;
    allowing the first person to select which of the first and second persons is to be a participant;
    selecting a plurality of questions from among a set of pluralities of questions at least in part according to a color personality as revealed by a sequential selection of a plurality of colors and selection by the first person of physical indicia that match or relate to the first person's color personality, the plurality of questions being directly identified with the physical indicia selected by the first person;
    selecting one of the plurality of questions to be answered, the selection being related to a color personality or preference of the participant;
    if the participant is the first person, recording a secret answer of the second person to the selected question whereas if the participant is the second person, recording the secret answer of the first person to the selected question;
    revealing the answer of the participant; and
    comparing the answer of the participant with the secret answer.

2. The method according to claim 1 in which the physical indicia have different colors to be chosen sequentially by the first person.

3. The method according to claim 1 in which the step of selecting one of the plurality of questions to be asked related to the color personality of the participant comprises the steps of selection of physical color indicia that match or relate to a participant's personality characteristic, the question to be asked then being directly identified with the physical color indicia.

4. The method according to claim 3 wherein the first person sequentially selects at least four different colors from a group of at least eight different colors.

5. The method according to claim 1 in which the step of choosing the first and the second person comprises alternating the position of the first person among the members of the group of persons practicing the method.

6. The method according to claim 5 in which the step of choosing the first and the second persons comprises the step of the first person choosing the second person.

7. The method according to claim 1 in which the question related to the color personality of the participant is related to the present behavior and state of mind of the participant.

8. The method according to claim 1 in which the question answered by the participant is related to the participant's desired future behavior and state of mind as perceived by the participant.

9. The method according to claim 1 further comprising the step of awarding points, physical objects or other indicia of success to the first person whenever the secret answer matches the answer of the participant.

10. The method according to claim 9, wherein the second person is also awarded points, physical objects or other indicia of success whenever the secret answer matches the answer of the participant.

11. An apparatus for learning about the relationships and personalities of a group of two or more persons, comprising:
a board having a top surface having a plurality of colored spaces constituting a plurality of paths or courses;
a plurality of tokens to indicate positions of a plurality of participating persons on the paths or courses of the board, each token having an upper surface in which are formed a plurality of openings or receptacles;
a plurality of pieces having a plurality of colors, the colored pieces being sized so as to fit into the openings in the upper surface of a token; and
a plurality of sets of question cards, one or more sides of each question card having a plurality of questions and a plurality of answers thereon related to aspects of color personality, the sets of question cards being at least partially colored with the colors of the colored pieces, one set per color, for use in determining which question card is chosen in accordance with the colors of the colored pieces selected by a first person for his or her player token and the colors of the colored spaces landed on by the first player, a question from the chosen question card to be addressed to a participant who is either the first or a second person, and to be secretly answered by the second or first person, respectively, the correct secret answers to such questions partially determining both scoring and movement of the first person's token on the paths or courses of the board.

12. The apparatus according to claim 11 in which the question cards have questions addressed to the present state of the participant's behavior and state of mind on a first side and questions addressed to the desired future behavior and state of mind of a participant on a second side.

13. The apparatus according to claim 11 in which the questions on the question cards are each uniquely identified with a colored marker for determination of the correct question to ask concerning a participant's color personality during a particular move.

14. The apparatus according to claim 13 in which the questions and a plurality of answers on a first side of the question cards are addressed to the present state of a participant's personality and the questions and a plurality of answers on a second side of each card are addressed to the future state of a participant's personality as perceived by the participant.

15. The apparatus according to claim 11 further comprising means for secretly recording a given participating person's answer to a question selected from a question card regarding the participant's personality for the purposes of determining movement of tokens and of scoring.

16. The apparatus according to claim 11 further comprising means to randomly determine movements of the tokens on the board.

17. An apparatus for learning about the relationships and personalities of a group of two or more persons, comprising
a board with an upper surface having a plurality of colored spaces constituting first and second paths or courses on the board;
a plurality of pieces having a plurality of colors;
a plurality of tokens to indicate positions of a plurality of participating persons on the paths or courses of the board, the plurality of tokens having upper surfaces in which are formed a plurality of openings or receptacles to receive at least two of the plurality of pieces;
a plurality of sets of questions cards, one or more sides of each question card having a plurality of questions thereon addressed to aspects of personality, the sets of question cards being at least partially colored with the colors of the colored spaces on the board, one set per color, for use in determining which question card is to be chosen, a question from the chosen question card being addressed to a first player, who has the turn, when that first player's player token is on the first course and the question being addressed to a second player when the first player, who has the turn, has his or her token on the second course, the question thus to be addressed to either the first or the second person and then secretly answered by the second or first person, respectively, correct secret answers to the question resulting in both scoring and the movement of the first player's token on the paths or courses of the board.

18. The apparatus according to claim 17 in which each question card has a first side containing a plurality of questions addressed to present aspects of a player's personality, and a second side containing a plurality of questions addressed to the desired future aspects of a player's personality, each question having next to it a colored marker having one of the colors of the colored pieces, each question on either the first or the second side of a question card having different colored markers, the same set of colors being used for the colored spaces on the board, the colored pieces, and the markers on the question cards so as to provide a means for determining which question on which card is to be answered by which participating person.

19. The apparatus according to claim 18 in which the means for determining which question on which question card is to be answered by which player comprises selection of the question appropriate to the color personality of the first person through the first person's sequential choice of colored pieces for his or her token.

20. The apparatus according to claim 18 in which the means for determining which question on which question card is to be answered by which player comprises selection of the question appropriate to the color personality of the second person through the second person's sequential choice of colored pieces for his or her token.

* * * * *